United States Patent
Inotsuka et al.

(10) Patent No.: US 9,240,298 B2
(45) Date of Patent: Jan. 19, 2016

(54) SWITCH

(71) Applicants: Niles Co., Ltd., Tokyo (JP); Aisin AW Co., Ltd., Aichi (JP)

(72) Inventors: Tetsuya Inotsuka, Tokyo (JP); Takeshi Okuhara, Tokyo (JP); Naoto Ogasawara, Aichi (JP); Hiroshi Yamada, Aichi (JP); Munetaka Torii, Aichi (JP); Teruo Kato, Aichi (JP)

(73) Assignees: Valeo Jap Co., Ltd. (JP); Aisin AW Co., Ltd. (JP)

( * ) Notice: Subject to any disclaimer, the term of this patent is extended or adjusted under 35 U.S.C. 154(b) by 337 days.

(21) Appl. No.: 13/743,126

(22) Filed: Jan. 16, 2013

(65) Prior Publication Data

US 2013/0186737 A1    Jul. 25, 2013

(30) Foreign Application Priority Data

Jan. 20, 2012    (JP) .................. 2012-010215

(51) Int. Cl.
*B60R 16/00*    (2006.01)
*H01H 11/06*    (2006.01)
(Continued)

(52) U.S. Cl.
CPC ............... *H01H 19/06* (2013.01); *B29C 65/04* (2013.01); *B29C 66/12449* (2013.01); *B29C 66/12469* (2013.01); *B29C 66/131* (2013.01);
(Continued)

(58) Field of Classification Search
CPC ......... H01H 11/06; H01H 19/56; H01H 1/00; H01H 1/12; H01H 3/00; H01H 3/08; H01H 3/32; H01H 3/40; H01H 3/54; H01H 9/00; H01H 9/02; H01H 15/00; H01H 15/02; H01H 15/10; H01H 19/00; H01H 2003/08; H01H 2003/10; H01H 2009/0044; H01H 2009/02; H01H 2009/04; H01H 2221/00; H01H 2221/008; H01H 2221/01; H01H 2221/024; H01H 2223/00; H01H 2223/002; H01H 2223/044; H01H 19/14; H01H 21/76; H01H 9/06; B60R 16/00
See application file for complete search history.

(56) References Cited

U.S. PATENT DOCUMENTS 5,525,768 A * 6/1996 Cobb et al. ................. 200/61.88
5,577,605 A   11/1996 Dilly et al.
(Continued)

FOREIGN PATENT DOCUMENTS

JP    2002-192617 A    7/2002

OTHER PUBLICATIONS

European Search Report issued May 13, 2014 for corresponding European Application No. 14 16 2393.

*Primary Examiner* — Edwin A. Leon
*Assistant Examiner* — Anthony R. Jimenez
(74) *Attorney, Agent, or Firm* — Fishman Stewart Yamaguchi PLLC

(57) ABSTRACT

The concave streak portion 26, in which the welding inclination surface 27 is formed, is provided on the side wall 12; the projecting portion 40, which is fitted into the concave streak portion 26 when the substrate 10 and the lid body 35 overlap to form the switch case 3, is provided on the lid body 36; when the substrate 10 and the lid body 35 are overlapped, the switch case 3 is sealed by contacting the seal ring 31 with the flange portion 38 and the welding shoulder portion 41 interferes with the welding inclination surface 27; the substrate 10 and the lid body 35 are jointed by melting the interference portion by high-frequency welding; the release region K, which keep the communicating state of the inside of the switch case 3 with the outside is designed by notching the projecting portion 40 from the root thereof.

18 Claims, 12 Drawing Sheets

(51) Int. Cl.

| | | |
|---|---|---|
| *H01H 19/56* | (2006.01) | |
| *H01H 19/06* | (2006.01) | |
| *H01H 9/04* | (2006.01) | |
| *H01H 19/58* | (2006.01) | |
| *B29C 65/00* | (2006.01) | |
| *B29C 65/04* | (2006.01) | |
| *F16H 59/10* | (2006.01) | |
| *B29L 31/34* | (2006.01) | |

(52) U.S. Cl.
CPC ....... *B29C66/1312* (2013.01); *B29C 66/30223* (2013.01); *B29C 66/342* (2013.01); *B29C 66/542* (2013.01); *B29C 66/543* (2013.01); *B29C 66/55* (2013.01); *B29C 66/8322* (2013.01); *H01H 9/047* (2013.01); *H01H 19/585* (2013.01); *B29L 2031/3443* (2013.01); *B60R 16/00* (2013.01); *F16H 59/105* (2013.01)

(56) References Cited

U.S. PATENT DOCUMENTS

| | | | |
|---|---|---|---|
| 5,693,925 A | * | 12/1997 | Yamada et al. ............ 200/61.88 |
| 5,969,313 A | | 10/1999 | Ikeshima et al. |
| 6,140,898 A | * | 10/2000 | Satoh et al. ................... 335/207 |
| 2010/0224468 A1 | | 9/2010 | Matsuhashi et al. |

* cited by examiner

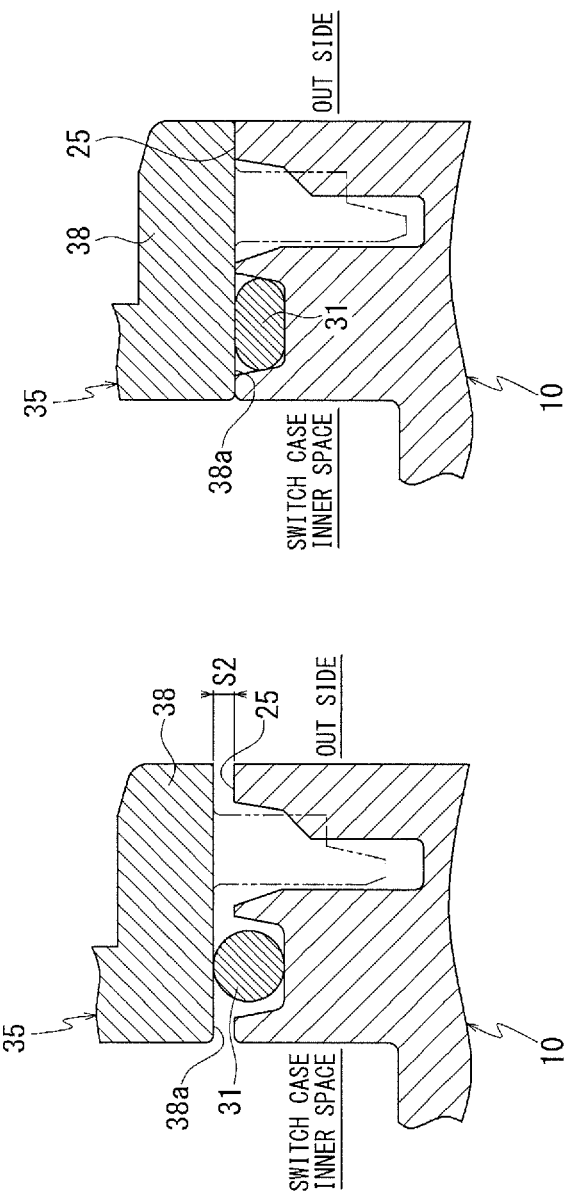

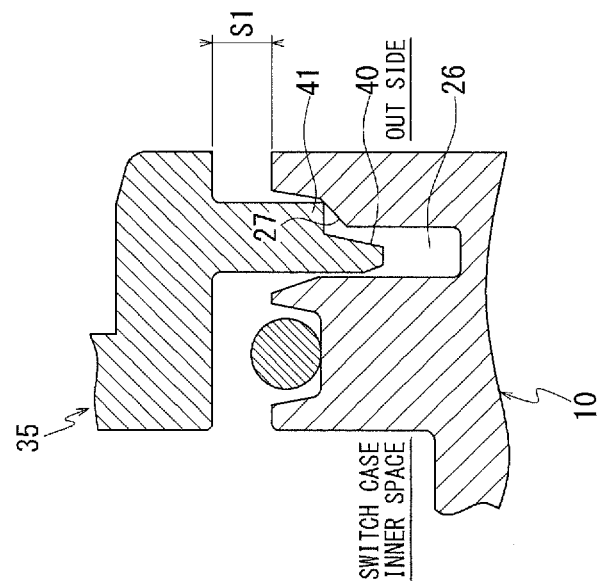
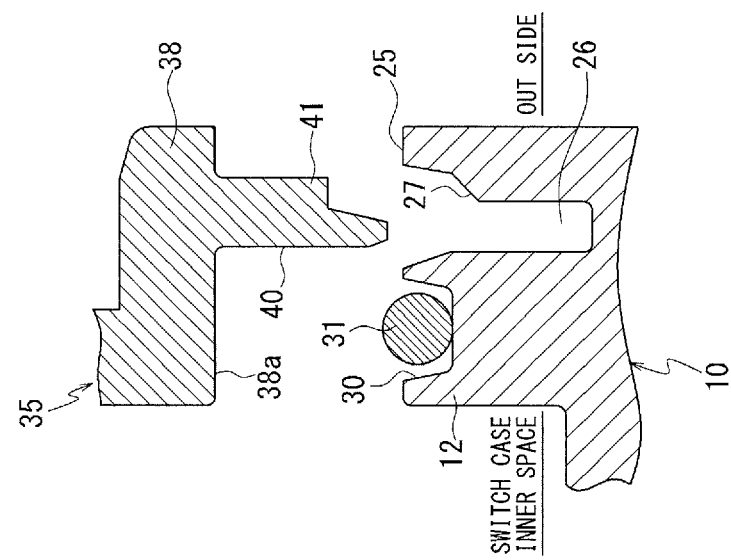

SWITCH

CROSS-REFERENCE TO RELATED APPLICATION

This application claims priority under 35 USC 119 from Japanese Patent Application No. 2012-010215 filed on Jan. 20, 2012, the disclosure of which is incorporated by reference herein.

BACKGROUND OF THE INVENTION

1. Field of the Invention

The present invention relates to a switch in which contact points are arranged in a switch case formed of a substrate and a lid body.

2. Description of Relevant Art

An example of this kind of switch includes a neutral start switch attached to a select lever for a vehicular automatic transmission. The neutral start switch is typically configured such that a switch case is formed of a plastic substrate and a plastic lid body, fixed contact points are arranged in the substrate, and movable contact points are arranged in a movable board movably arranged in the switch case. The substrate is formed in a fan shape and has a shaft hole penetrating therethrough at the rotational center thereof. A plurality of rows of fixed contact points, formed in an arc shape around the shaft hole, is arranged on the substrate. The fixed contact point has a connecting piece portion extending within the substrate by insert molding, and a tip end of the connecting piece portion is exposed as a terminal to a connector portion formed integrally with the substrate.

In this switch, the movable contact point slides along the fixed contact point while keeping the contact with the fixed contact when the movable board turns around the shaft hole, and thereby a switching operation is performed. Seal rings are provided between a shaft of the movable board and the shaft hole such that water, mud or the like does not enter into the switch case in which the fixed contact point and the movable board are arranged. In a joint portion between the substrate and the lid body, a seal ring is provided and a joint structure by welding is adopted. An example of the joint structure by welding includes a share joint method. In a case of the neutral start switch, the share joint method high in the welding degree is used in view of requiring high joint strength between the substrate and the lid body for certainly maintaining the sealed condition in the inside of the switch.

FIGS. 9A to 9D show the jointing process of a joint structure between a substrate 10 and a lid body 35 in a case of welding them by the share joint method. As shown in FIG. 9A, a side wall 12 of the substrate 10 is closed by surrounding an entire circumference of a rotary region of the movable board (not shown). A ring groove 30 which accommodates a seal ring 31 therein and a concave streak portion 26 are formed on a top surface 25 of the side wall 12. The ring groove 30 and the concave streak portion 26 are formed in this order from the inside and are provided along the entire length of side wall 12. A welding inclination surface 27 is formed in the concave streak portion 26 of the side wall 12 at an outer peripheral side in the depth portion thereof. In addition, the lid body 35 is provided with a projecting portion 40 on a lower surface 38a of a flange portion 38. The projecting portion 40 is provided at the position opposing to the top surface 25 of the substrate 10, and extends in the entire circumference along a peripheral edge of the flange portion 38 to close the lid body 35. The projecting portion 40 is fitted in the concave streak portion 26 of the side wall 12 when assembling the switch case.

A welding shoulder portion 41 is formed in the projecting portion 40 at the outer peripheral side in the intermediate position thereof. When the top surface 25 of the side wall 12 makes contact with the lower surface 38a of the lid body 35, the welding shoulder portion 41 of the projecting portion 40 is designed to interfere with the welding inclination surface of the concave streak portion 26. As a result, high-frequency welding causes melting of the interference portion, so that the projecting portion 40 and the side wall 12 are jointed along the entire circumference. For example, Japanese Patent No. 4509370 discloses the configuration as similar to the above.

In the aforementioned joint structure, when the projecting portion 40 of the lid body 35 is in the process of being inserted into the concave streak portion 26 of the substrate 10 while interposing the movable board (not shown) between the substrate 10 and the lid body 35, as shown in FIG. 9B a corner of the welding shoulder portion 41 of the projecting portion 40 first makes contact with the welding inclination surface 27 of the concave streak portion 26. In this state a gap S1 remains between the top surface 25 of the side wall 12 and the lower surface 38a of the lid body 35. The ring groove 30 has a depth smaller than a diameter of the seal ring 31 in a free state, and the seal ring 31 partly projects from the ring groove 30.

As the lid body 35 is further pressed to the substrate 10 from a position of FIG. 9B in the high-frequency applied state, the interference (overlap) portion between the welding shoulder portion 41 and the welding inclination surface 27 is welded while melting the interference portion. Thereby, the lid body 35 moves in the approaching direction relatively to the substrate 10.

In addition, as shown in FIG. 9C after the lower surface 38a of the lid body 35 makes contact with the seal ring 31 in the ring groove 30, it presses the seal ring 31, and finally, as shown in FIG. 9D, the lower surface 38a is seated on the top surface 25. Therefore the projecting portion 40 and the side wall 12 are jointed along the entire circumference by welding, and together with the sealing operation between the seal ring 31 and the lower surface 38a, the inside of the switch case becomes in a sealing condition to an outside.

In this kind of switch, generally a contact-point grease is applied to the contact point of the switch for improving endurance and current-carrying properties at contacting of contact point. But, in the sealed type of switch as descrambled above, there occurs the event that the connector portion around the terminal is wet with oil.

According to the study on the cause of the above event, the following point is found out. In case of the switch discussed above, the conductive-metallic fixed contact point is insert-molded to the plastic substrate. However, since a perfectly adhesive state is not formed between the fixed contact point and the plastic, the grease on the fixed contact point flows along the interface between the fixed contact point and the plastic and leaks into the connector portion.

This event is supposed to occur because a pressure in the switch case is higher than the outside pressure, and therefore the grease is pushed out through the interface between the fixed contact point and the plastic. That is, in the jointing process between the substrate 10 and the lid body 35, an inner space interposed between the substrate 10 and the lid body 35 is blocked out from the outside when the lid body 35 reaches at the position shown in FIG. 9B. Then, the inner space is compressed in a height direction by the height of gap S1 when the lid body 35 is pushed to the substrate 10 from the position in FIG. 9B to the position in FIG. 9D. In this case, since the welding shoulder portion 41 and the welding inclination surface 27 are welded with each other to increase the welding amount, the welding strength is increased. However, the pressure in the inner space becomes greatly higher than the outside pressure. Here, the region between the shaft portion of the movable board and the shaft hole is also sealed by the seal ring. Accordingly, also after the switch is mounted on the automatic transmission or the like as a product, the higher-pressure state is held in the switch case than that of the outside. Therefore the grease applied on the fixed contact point of the substrate before the substrate is jointed to the lid body is exposed to this high pressure.

Therefore, it has been required to provide a switch which prevents water, mud and the like from entering into a switch case and at the same time, reduces a pressure in the switch case for preventing leakage of grease into a connector portion.

SUMMARY OF THE INVENTION

The present invention relates to a switch comprising:
a substrate,
a lid body provided to overlap the substrate to form a switch case,
a movable board rotatably arranged in the switch case,
a plurality of fixed contact points provided on the substrate, movable contact points provided on the movable board,
the fixed contact point and the movable contact point being connected/disconnected with rotation of the movable board, and a connecting piece portion extending inside the substrate to be connected to the fixed contact point, and being exposed as a terminal outside of the switch case, wherein
the substrate and the lid body respectively include opposing surfaces opposing with each other in the peripheral edge of the switch case,
a concave streak portion is provided in one of the opposing surface of the substrate and the opposing surface of the lid body, the concave streak portion being provided with a first welding interference portion formed in the depth portion,
a projecting portion is provided in the other of the opposing surface of the substrate and the opposing surface of the lid body, the projecting portion being fitted in the concave streak portion and being provided with a second welding interference portion formed in a predetermined section in the overlapping direction,
a ring groove for accommodating a seal ring is formed in the one of the opposing surface provided with the concave streak portion and the opposing surface provided with the projecting portion and the other is formed as a seal surface making contact with the seal ring,
when the substrate and the lid body overlap, the switch case is sealed by contact between the seal ring and the seal surface and the substrate and the lid body are jointed by the welding between the first welding interference portion and the second welding interference portion, and
a release region for keeping a communicating state of an inside of the switch case with an outside until the seal ring makes contact with the seal surface in the jointing process between the substrate and the lid body is provided in any of the substrate and the lid body in a circumferential predetermined section thereof.

According to the invention, the communicating state of the inside of the switch case with the outside is kept through the release region until the inside of the switch case is sealed by the seal ring, when jointing the substrate and the lid body by melting the interference portion between the first welding interference portion and the second welding interference portion by welding. Thereby, the pressure in the switch case is suppressed to be low at the time of sealing. Thus, the phenomenon that the grease is pushed out to the terminal portion exposed to the outside along the connecting piece portion can be prevented, even if the grease is applied to the fixed contact point. Also, the substrate and the lid body can be certainly jointed, and the sealing ring can be interposed in a compressed state between the lid body and the substrate to certainly keep the sealing degree in the switch inside.

BRIEF DESCRIPTION OF THE DRAWINGS

Other objects, features, and advantages of the present invention will become more apparent from the following detailed description made with reference to the accompanying drawings, in which like parts are designated by like reference numbers and in which:

FIGS. 4A to 4D are enlarged cross sections each showing a release region in the jointing process between the substrate and the lid body according to the first embodiment;

FIGS. 9A to 9D are enlarged cross sections each showing the jointing process between a substrate and a lid body according to the conventional example.

DESCRIPTION OF THE PREFERRED EMBODIMENTS

Hereinafter, an explanation will be made of a neutral start switch according to an embodiment in the present invention.

Figure 1A:
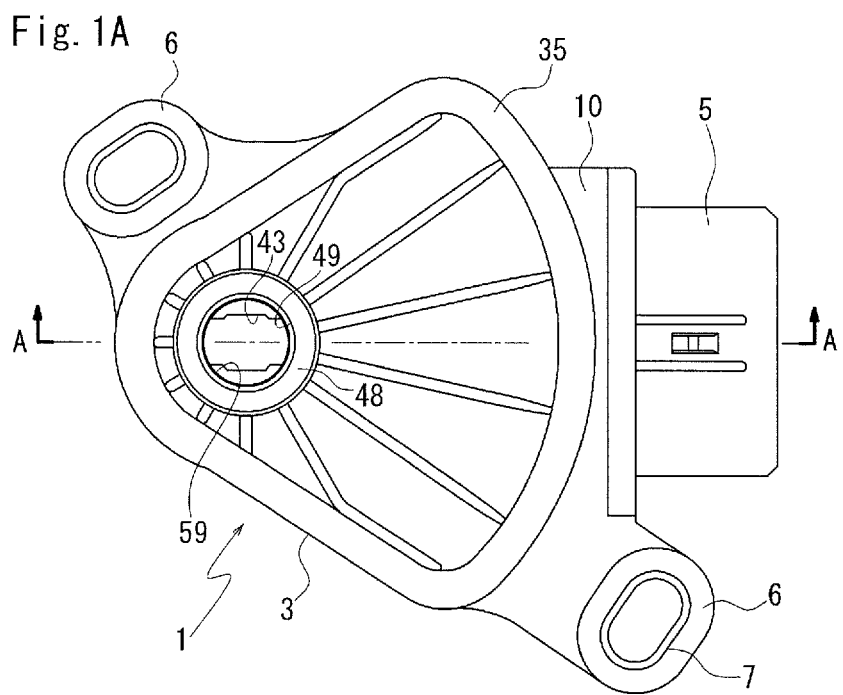
FIGS. 1A and 1B are diagrams showing a switch according to an embodiment in the present invention.
Figure 1B:
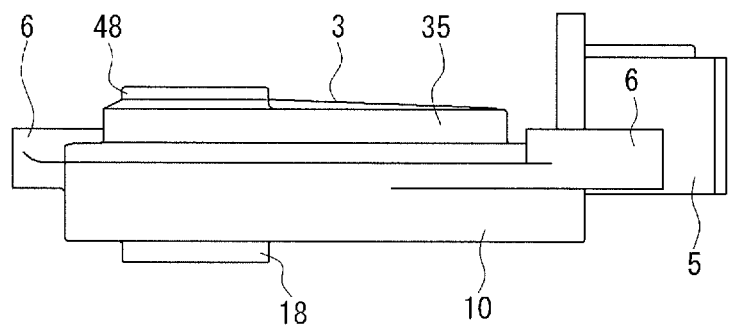
Figure 2:
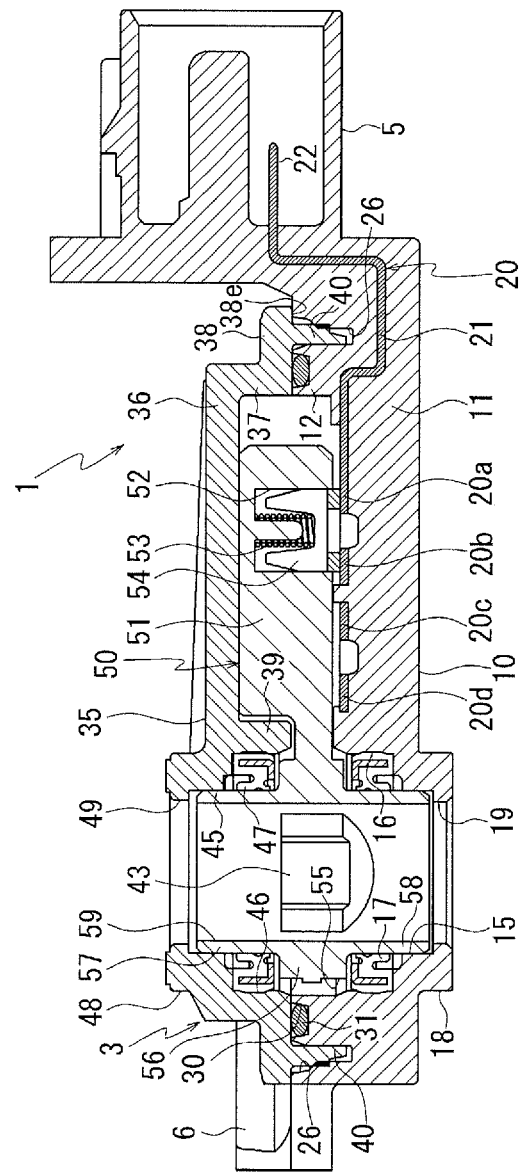
FIG. 2 is an enlarged cross section taken in a direction of lines A-A in FIG. 1A.
Figure 3:
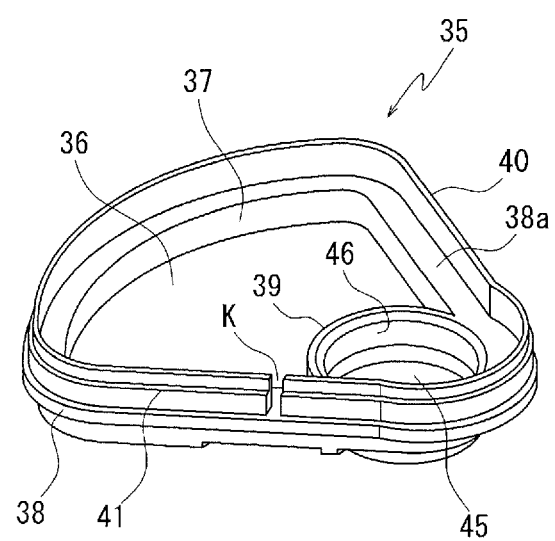
FIG. 3 is a perspective view showing a lid body according to a first embodiment in the present invention.

FIGS. 1A and 1B show a neutral start switch 1 according to an embodiment. FIG. 1A is a top view thereof, and FIG. 1B is a side view thereof. FIG. 2 is an enlarged cross section taken in a direction of lines A-A in FIG. 1A. FIG. 3 is a perspective view showing a lid body 35 reversed in an upper-lower direction.

The neutral start switch 1 is provided with a switch case 3 formed of a plastic substrate 10 and a plastic lid body 35. As shown in FIG. 2, fixed contact points 20 are provided on the substrate 10, and a movable board 50 provided with movable contact points 54 is accommodated in the switch case 3. The substrate 10 comprises a bottom wall 11 provided with the fixed contact points 20 (20a to 20d), a side wall 12 rising from a peripheral edge of the bottom wall 11, and a connector portion 5 extending outward of the side wall 12 from the bottom wall 11 and positioned outside of a region where the lid body 35 overlaps the side wall 12.

A shaft hole 15 for accommodating a shaft portion 55 of the movable board 50 is bored through the bottom wall 11 of the substrate 10. A seal receiving portion 16 enlarged in a diameter than the shaft hole 15 is provided in the inner end of the shaft hole 15. A ring-shaped seal member 17 is held in the seal receiving portion 16. The bottom wall 11 is formed in a fan shape and has a shaft hole 15 at an apex position thereof. A plurality of rows of fixed contact points 20, formed in an arch shape around the shaft hole 15, is exposed on the surface of the bottom wall 11. Thus, the sliding on the fixed contact points 20 of the movable contact points 54 in the movable board 50 is allowed.

Each fixed contact point 20 is embedded in the bottom wall 11 by insert molding, and a connecting piece portion 21 thereof extends to the connector portion 5. A tip end of the connecting piece portion 21 used as a terminal 22 of the connector portion 5 is exposed to an outside.

As shown in FIG. 1, mount portions 6, for mounting the neutral start switch 1 on an automatic transmission, are formed in the substrate 10, and these mount portions 6 are formed at an outside of the region where the lid body 35 overlaps the substrate 10. A metallic bracket 7 is embedded in each of the mount portions 6.

Particularly as shown in FIG. 3, the lid body 35 has a fan-like planar configuration corresponding to the bottom wall 11 of the substrate 10, and has a flange portion 38 opposing a top surface 25 (see FIGS. 4A and 4B) of the side wall 12 in the substrate 10. The flange portion 38 is provided at the lower edge of a side wall 37 which surrounds the peripheral edge of an upper wall 36.

The flange portion 38 has a lower surface 38a which serves as a seal surface making contact with a seal ring 31 arranged on the top surface 25 to seal the switch case 3. The lower surface 38a is provided with a projecting portion 40 formed to correspond to a concave streak portion 26 of the substrate 10. A welding shoulder portion 41 is formed in the projecting portion 40 at the outer peripheral side in the intermediate position in the height direction thereof.

Also with reference to FIG. 2, the upper wall 36 is provided with a shaft hole 45 which houses therein the shaft portion 55 of the movable board 50. The shaft hole 45 is bored through the upper wall 36 from inside to outside, and is located at the position corresponding to the shaft hole 15 of the bottom wall 11. A seal receiving portion 46 which has a diameter larger than the shaft hole 45 is provided in the shaft hole 45.

The seal receiving portion 46 is located at inner side end of the shaft hole 45 and is opened to the inside space of the switch case 3. A ring-shaped seal member 47 is held in the seal receiving portion 46. A projecting portion 39 is formed on the inner surface of the upper wall 36. The projecting portion 39 is formed by elongating the predetermined regions, which corresponds to the seal receiving portion 46 surrounding the shaft hole 45, to the inside of the switch case 3.

As shown in FIG. 2, a boss portion 18 is formed on an outer surface of the bottom wall 11 in the substrate 10 to correspond to the shaft hole 15, and a boss portion 48 is formed also on an outer surface of the upper wall 36 in the lid body 35 to correspond to the shaft hole 45. The shaft hole 15 does not extend to an outer end of the boss portion 18, and a hole 19 is formed in the boss portion 18 to be coaxial with the shaft hole 15. The hole 19 has a diameter slightly smaller than that of the shaft hole 15, and larger than that of a through hole 59 of the shaft portion 55. That is, the through hole 59 is opened through the hole 19 to an outside. Similarly the shaft hole 45 does not extend to an outer end of the boss portion 48, and a hole 49 is formed in the boss portion 48 to be coaxial with the shaft hole 45. The hole 49 has a diameter slightly smaller than that of the shaft hole 45, and larger than that of the through hole 59.

The movable board 50 comprises a plastic contact point support portion 51 for supporting the movable contact point 54, and the shaft portion 55 integral with the contact point support portion 51. The shaft portion 55 comprises an upper shaft portion 57 extending upwards and a lower shaft portion 58 extending downwards to interpose a diameter enlarged portion 56 therebetween, and the contact point support portion 51 extends in a radial direction from the diameter enlarged portion 56. The shaft portion 55 is provided with the through hole 59 penetrating from the upper shaft portion 57 to the lower shaft portion 58, and a two-faced width portion 43 is formed in the through hole 59.

The upper shaft portion 57 and the lower shaft portion 58 of the shaft portion 55 extend on the same axial line, and are respectively supported by the shaft hole 45 of the lid body 35 and the shaft hole 15 of the substrate 10. Thereby, the contact point support portion 51 is rotatable around the shaft portion 55 acting as an axis in the switch case 3. The contact point support portion 51 is provided with a movable contact point retaining hole 52 opened to face the bottom wall 11 of the substrate 10, and the movable contact point 54 accommodated in the movable contact point retaining hole 52 is urged against the fixed contact point 20 on the bottom wall 11 by a spring 53. Here, the contact point support portion 51 has a plurality of movable contact points 54 are provided to correspond to a plurality of rows of the fixed contact points 20. In this embodiment, in order to simplify the figure, only the single movable contact point 54 is illustrated in FIG. 2.

The upper surface of the contact point support portion 51 contacts slidably with the inner surface of the upper wall 36 at an outside in a radial direction of the projecting portion 39 of the lid body 35.

As described above, since the hole 19 opened to the boss portion 18 of the substrate 10 is smaller in a diameter than the shaft hole 15 and the hole 49 opened to the boss portion 48 of the lid body 35 is also smaller than the shaft hole 45, a rotary surface between the shaft portion 55 (upper shaft portion 57 and lower shaft portion 58) and each of the shaft holes 15 and 45 is hidden from an outside. Thereby, the immersion of dusts or water into the rotary surface is prevented.

Further, in each of the seal receiving portions 16 and 46, a seal structure is formed to each of the upper shaft portion 57 and the lower shaft portion 58 of the shaft portion 55 by each of the seal members 17 and 47 retained in each of the seal receiving portions 16 and 46. Therefore, this seal structure can certainly block out the entering of dusts or the like into the switch case 3 from the rotary surface between the shaft portion 55 and each of the shaft holes 45 and 15.

Next, the joint structure between the substrate 10 and the lid body 35 in a case of welding them by a share joint method will be explained.

Figure 9C:
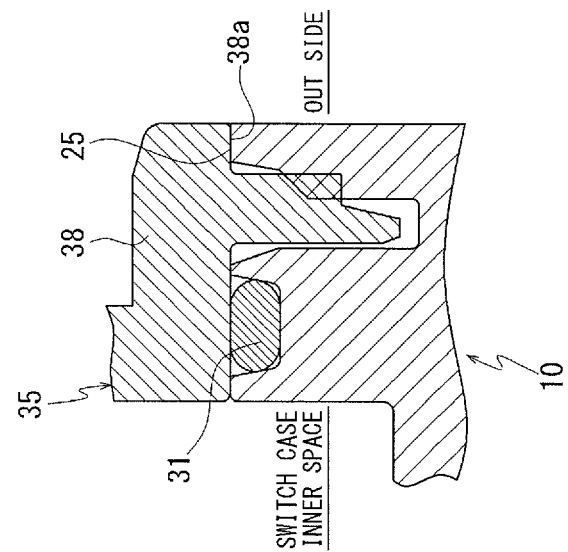
Figure 9D:
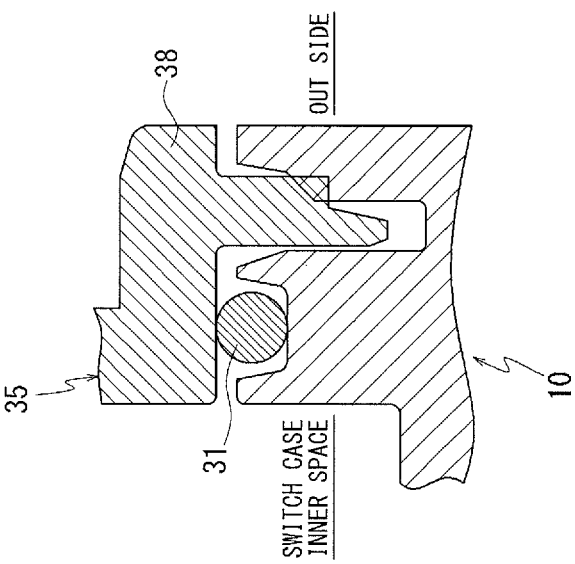

The side wall 12 of the substrate 10 surrounds the entire circumference of the bottom wall 11 for closure, and the concave streak portion 26 is formed along the entire circumference of the side wall 12 on the top surface 25. In addition, the projecting portion 40 of the lid body 35 also surrounds a substantially entire circumference of the lid body 35 other than a predetermined release region K (see FIG. 3). When assembling the switch case 3, the projecting portion 40 is fitted into the concave streak portion 26 of the side wall 12, and then the projecting portion 40 and the side wall 12 are jointed by high-frequency welding. Thereby, the switch case 3 in which the substrate 10 and the lid body 35 are integrated with each other is obtained. The joint structure other than the predetermined release region K is the same as the conventional structure, and the welding portion between the lid body 35 and the substrate 10 is the same as the structure shown in FIG. 9D.

The release region K is provided to release a pressure in the switch case 3 when assembling the switch case 3 by joining the substrate 10 and the lid body 35 each other. The release region K is provided at the predetermined position of the projecting portion 40, and is formed by notching the projecting portion 40 from the base thereof. In other words, the release region K is formed by removing the projecting portion 40 from the boundary between the projecting portion 40 and the lower surface 38a of the flange portion 38.

Figure 4A:
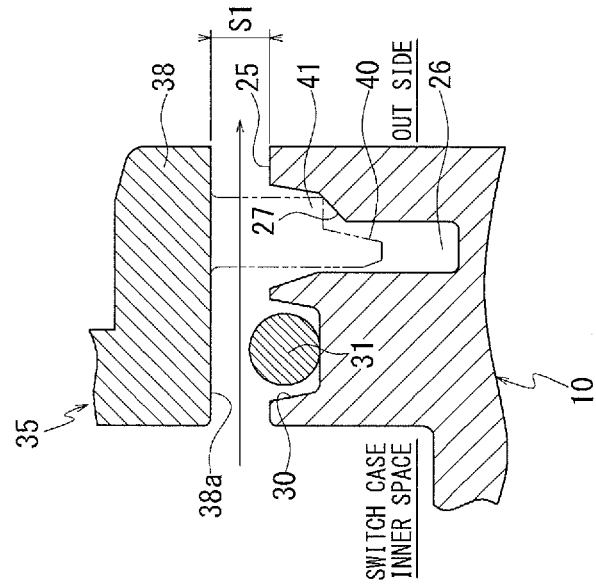

FIGS. 4A to 4D are enlarged cross sections each showing a joint portion between the substrate 10 and the lid body 35 in the release region K portion, and the jointing process thereof. Prior to jointing, as shown in FIG. 4A, the side wall 12 of the substrate 10 surrounds the entire circumference of the bottom wall 11 for closure, and the ring groove 30 for accommodating the seal ring 31 and the concave streak portion 26 are formed along the entire circumference of the side wall 12 in that order from the inside thereof on the top surface 25. A welding inclination surface 27 is formed in the concave streak portion 26 of the side wall 12 at the outer peripheral side in the depth portion. In the figure, a virtual line shows a general section other than the release region K. The release region K is configured as a slit-shaped notch, for example, having a width of 1.5 mm in the circumferential direction of the projecting portion 40.

Figure 4B:
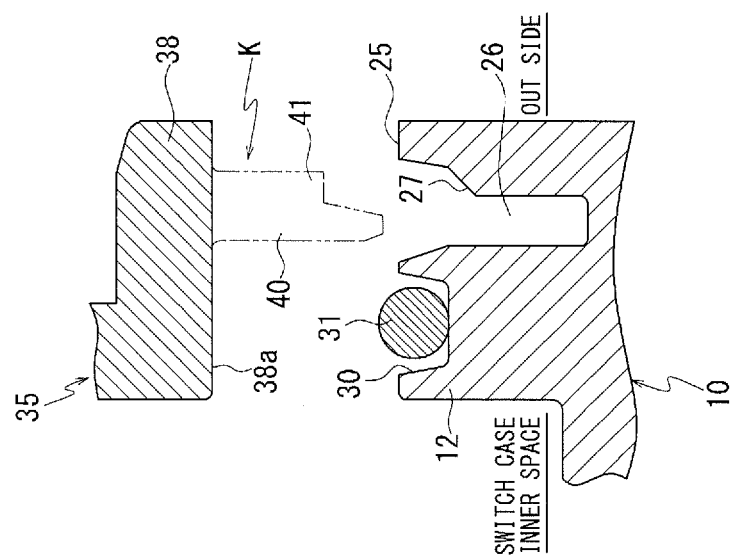

When the projecting portion 40 of the lid body 35 is in the halfway of being inserted into the concave streak portion 26 of the substrate 10, a corner of the welding shoulder portion 41 in the projecting portion 40 first makes contact with the welding inclination surface 27 of the concave streak portion 26 on the general section. Here, since the projecting portion 40 is notched in the release region K, as shown in FIG. 4B an inner space of the switch case 3 formed between the lid body 35 and the substrate 10 is communicated with an outside from a gap between the seal ring 31 fitted into the ring groove 30 and the lower surface 38a of the flange portion 38 through the notch. Therefore, air in the inner space escapes to an outside as shown in an arrow, when the lid body 35 is pressed to the substrate 10 while welding the interference portion between the welding shoulder portion 41 and the welding inclination surface 27. Thereby, the pressure in the inner space does not increase, even if a volume of the inner space between the lid body 35 and the substrate 10 is reduced due to the progress of the melting of the interference portion by welding.

As shown in FIG. 4C, when the lower surface 38a of the flange portion 38 makes contact with the seal ring 31 in the ring groove 30, the inner space formed between the lid body 35 and the substrate 10 is eventually blocked out from the outside by the seal ring 31 also in the release region K. After that, as the lid body 35 is further pressed to the substrate 10, as shown in FIG. 4D finally, the lower surface 38a of the flange portion 38 is seated on the top surface 25 of the side wall 12. Thereby the projecting portion 40 and the side wall 12 are welded substantially along the peripheral edge to be certainly jointed, and the seal ring 31 is interposed in a compressed state between the lid body 35 and the substrate 10. As a result, the inside of the switch case 3 is kept in a sealing state to an outside.

As described above, during a period from a point where the welding shoulder portion 41 and the welding inclination surface 27 make contact with each other to a point where the interference portion of the both is welded to seal the switch case 3 (period from gap S1 to gap S2, see FIG. 4B and FIG. 4C), the communicating state of the inside of the switch case 3 with an outside is kept through the release region K. As a result, the pressure in the switch case 3 does not increase until a position shown in FIG. 4C. In addition, a change in the gap between the lid body 35 and the substrate 10 from FIG. 4C to FIG. 4D is caused by deflecting the seal ring 31 projecting slightly from the ring groove 30 by the projecting amount. Therefore the remaining pressure caused by this change is as extremely small as substantially negligible, as compared to the pressure generated in the conventional switch case 3.

It should be noted that since the release region K is formed by notching the projecting portion 40 from the root, the air in the switch case 3 linearly flows to an outside along the lower surface 38a of the flange portion 38 during the process of high-frequency welding. In this case, the air can flow to outside almost without receiving a resistance. Therefore only if the release region K having the notch of a width of 1.5 mm is provided in one or two locations in the circumferential direction of the switch case 3, it is sufficient for the air release. It is preferable that a predetermined section for setting the release region K is separated from the mount portion 6 of the substrate 10 such that the stress concentration as much as to bring out a reduction in welding strength by heat transfer from the automatic transmission is not generated in the cut-off portion of the projecting portion 40.

The first embodiment is configured as described above. That is: the concave streak portion 26, in which the welding inclination surface 27 is formed in the depth portion, is provided on the top surface of the side wall 12; the projecting portion 40, which is fitted into the concave streak portion 26 when the substrate 10 and the lid body 35 overlap to form the switch case 3, is provided on the flange portion 38 of the lid body 36; the welding shoulder portion 41 is formed in the intermediate position in the overlapping direction; the ring groove 30 for accommodating the seal ring 31 is provided on the tip surface 25; when the substrate 10 and the lid body 35 are overlapped, the switch case 3 is sealed by contacting the seal ring 31 with the lower surface 38a of the flange portion 38 and the welding shoulder portion 41 interferes with the welding inclination surface 27; the substrate 10 and the lid body 35 are jointed by melting the interference portion by high-frequency welding; the release region K, which keep the communicating state of the inside of the switch case 3 with the outside until the seal ring 31 makes contact with the lower surface 38a of the flange portion 38 in the jointing process between the substrate 10 and the lid body 35, is designed by notching the projecting portion 40 from the root in the circumferential predetermined section thereof.

That is, since the projecting portion 40 is notched from the root to form the release region K and the welding shoulder portion 41 is not provided in the release region K, there is no possibility that the welding shoulder portion 41 makes contact with the welding inclination surface 27. Thereby, since the inside of the switch case 3 is not cut off from the outside, the pressure in the switch case 3 does not increase. Accordingly, the movement of the grease along the connecting piece portion 21 is not caused even if the grease is applied to the fixed contact point 20. Thus, the leakage of the grease to the connector portion 5 can be prevented.

In addition, the substrate 10 and the lid body 35 are certainly jointed and the seal ring 31 is interposed in a compressed state between the lid body 35 and the substrate 10. Thereby it is possible to keep the sealed degree in the switch case 3.

In addition, since the ring groove 30 for accommodating the seal ring 31 is provided on the top surface 25 of the side wall 12 in the substrate 10, there is no possibility that the seal ring 31 drops at the time of pushing the lid body 35 to the substrate 10, so that an assembling operation thereof is easy to perform. In addition, after jointing the lid body 35 and the substrate 10, since the release region K is not communicated with the outside, there is an advantage that the entering of water or mud through the release region K can be prevented.

It should be noted that the ring groove 30 is arranged inside of the concave streak portion 26, but the welding is simply configured to be not performed in the release region K because of the configuration change (cutting off) of the projecting portion 40. Therefore the sealing operation of the seal ring 31 to the switch case 3 is not influenced at all by the arrangement of the ring groove 30. Therefore the ring groove 30 may be arranged outside of the concave streak portion 26.

Figure 5A:
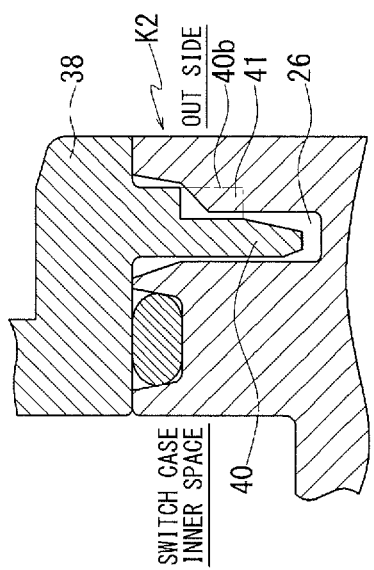
FIGS. 5A and 5B are enlarged cross sections each showing a modification of a release region.
Figure 5B:
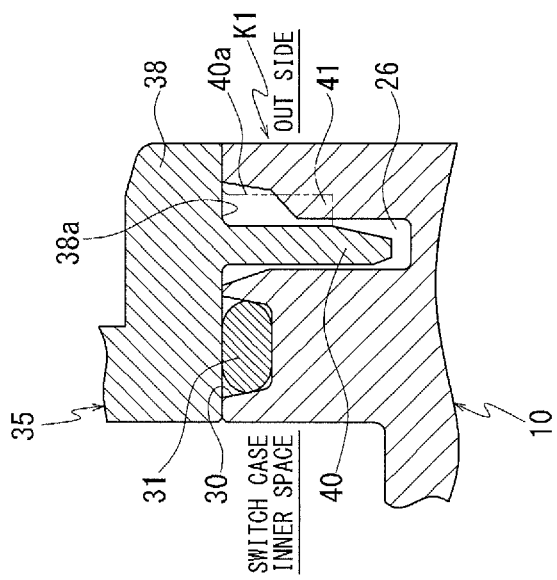

In the above embodiment, the release region K is formed by notching the projecting portion 40 from the root, but a modification of the release region may adopt forms as shown in FIGS. 5A and 5B. FIG. 5A shows a release region K1 in which the projecting portion 40 is formed in a thin plate shape having a constant thickness by cutting off a step section 40a forming the welding shoulder portion 41 from the root while keeping the height of the projecting portion 40 from the flange portion 38 of the lid body 35. In addition, FIG. 5B shows a release region K2 in which a corner portion 40b as a step section forming the welding shoulder portion 41 is cut off to the extent of not interfering with the welding inclination surface 27 of the concave streak portion 26 while keeping the height of the projecting portion 40 from the flange portion 38 of the lid body 35. As compared to the structure in FIG. 5A, a portion of the projecting portion 40 at the side of the flange portion 38 remains to be as thick as it is.

Also in each of these modifications as shown in FIGS. 5A and 5B, as similar to the first embodiment, the remaining pressure in the switch case 3 does not increase because of maintaining the communication between the inside and the outside of the switch case 3 in each of the release regions K1 and K2 during the jointing process by the welding between the substrate 10 and the lid body 35. Therefore the movement of the grease along the connecting piece portion 21 is not caused even if the grease is applied to the fixed contact point 20. In addition, particularly since the projecting portion 40 is not notched and is provided along entire periphery of the flange portion 38, there is an advantage of not giving any adverse influence on the rigidity of the lid body 35.

Further, since the projecting portion 40 has no change other than the configuration change, an inside/outside arrangement position of the ring groove 30 to the concave streak portion 26 can be arbitrarily made as in the case of the embodiment. It should be noted that since the air escaping to the outside from the inside of the switch case 3 is required to bypass the projecting portion 40 in the jointing process between the substrate 10 and the lid body 35, it is preferable to relatively increase the setting number of the release region K1 or K2 in a case where the resistance becomes larger as compared to a case of the first embodiment.

Figure 6A:
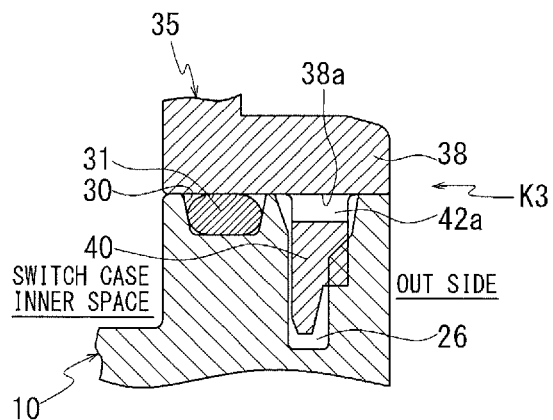
FIGS. 6A to 6C are enlarged cross sections each showing a release region according to each of a second embodiment in the present invention and modifications thereof.

The release region may adopt other embodiments. FIG. 6A shows a release region K3 according to a second embodiment. It should be noted that an entire basic configuration in the second embodiment is the same as the configuration of the neutral start switch 1 shown in FIG. 1 to FIG. 3 other than the release region K. In this embodiment, it is enabled to maintain the communicating state of the inside of the switch case 3 with the outside thereof in the jointing process between the substrate 10 and the lid body 35, while enabling high-frequency welding of the entire circumference of switch case 3.

The release region K3 is provided by forming a through hole 42a in parallel to the lower surface 38a of the flange portion 38 at the root of the projecting portion 40 in place of cutting off at least the welding shoulder portion 41 of the projecting portion 40. In this case also, the air is promptly discharged from the inside of the switch case 3 through the through hole 42a until the seal ring 31 makes contact with the lower surface 38a of the flange portion 38 in the jointing process between the substrate 10 and the lid body 35. An inside/outside arrangement position of the ring groove 30 to the concave streak portion 26 can be arbitrarily made as in the case of the first embodiment.

Figure 6B:
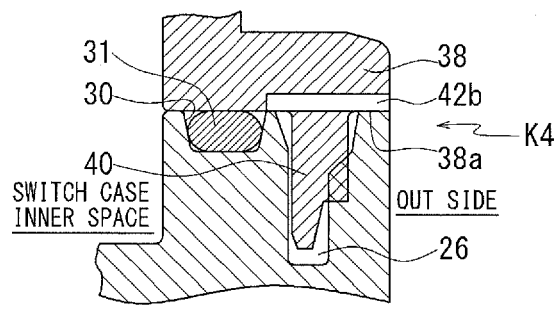

FIG. 6B shows a modification according to the second embodiment. A through hole 42b penetrating outwards is formed in the inside of the lower surface 38a of the flange portion 38 in a position deeper than the root of the projecting portion 40. The through hole 42b is opened in the vicinity of the projecting portion 40 than the contact position between the flange portion 38 and the seal ring 31, and thereby a release region K4 is formed. The through hole 42b is configured in a groove shape at outward of the projecting portion 40. In this case, if the ring groove 30 is arranged outside of the concave streak portion 26, the seal ring 30 accommodated in the ring groove 30 only comes across on the groove in which the through hole 42b is exposed, and can not block out the through hole 42b. Therefore the ring groove 30 is arranged inside of the concave streak portion 26. An outside region of the seal ring 31 is regularly communicated with an outside through the through hole 42b, but the switch case 3 is sealed by the seal ring 31 after jointing the substrate 10 and the lid body 35. This structure also enables that maintaining the communicating state of the inside of the switch case 3 with the outside thereof in the jointing process between the substrate 10 and the lid body 35, while enabling high-frequency welding of the entire circumference of switch case 3.

Figure 6C:
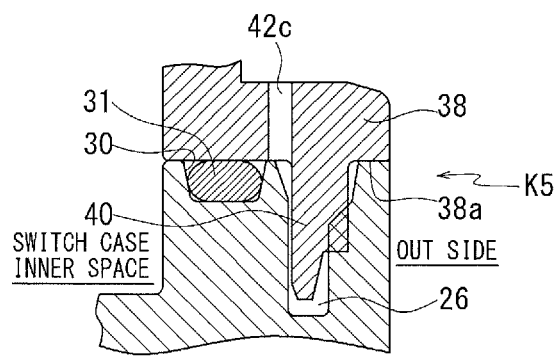

FIG. 6C shows the other modification according to the second embodiment. A through hole 42c is formed by penetrating the flange portion 38 in a thickness direction of the flange portion 38, and the lower surface 38a and outside of the flange portion 38 are communicated by the through hole 42c which is opened in the vicinity of the projecting portion 40 than the contact position between the flange portion 38 and the seal ring 31. Thereby a release region K4 is formed. In this case also, the ring groove 30 is required to be arranged inside of the concave streak portion 26. An outside region of the seal ring 31 is regularly communicated with an outside through the through hole 42c, but the switch case 3 is sealed by the seal ring 31 after jointing the substrate 10 and the lid body 35. This structure also enables that maintaining the communicating state of the inside of the switch case 3 with the outside thereof in the jointing process between the substrate 10 and the lid body 35, while enabling high-frequency welding of the entire circumference of switch case 3.

Also in each of the aforementioned second embodiment and the modifications, as similar to the first embodiment, the remaining pressure in the switch case 3 does not increase. Therefore the movement of the grease along the connecting piece portion 21 is not caused even if the grease is applied to the fixed contact point 20. In addition, since the welding shoulder portion 41 of the projecting portion 40 is not cut off, the entire circumference between substrate 10 and the lid body 35 is jointed by welding to ensure high joint strength.

Figure 7:
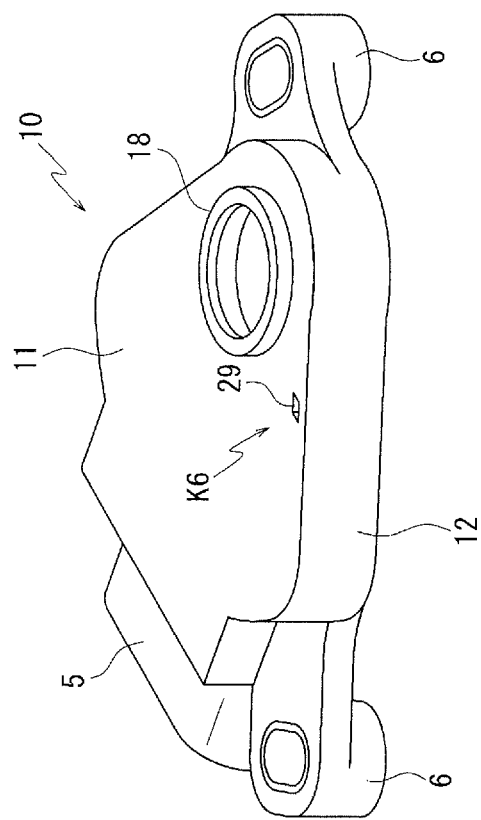
FIG. 7 is a perspective view showing a lid body according to a third embodiment in the present invention.
Figure 8A:
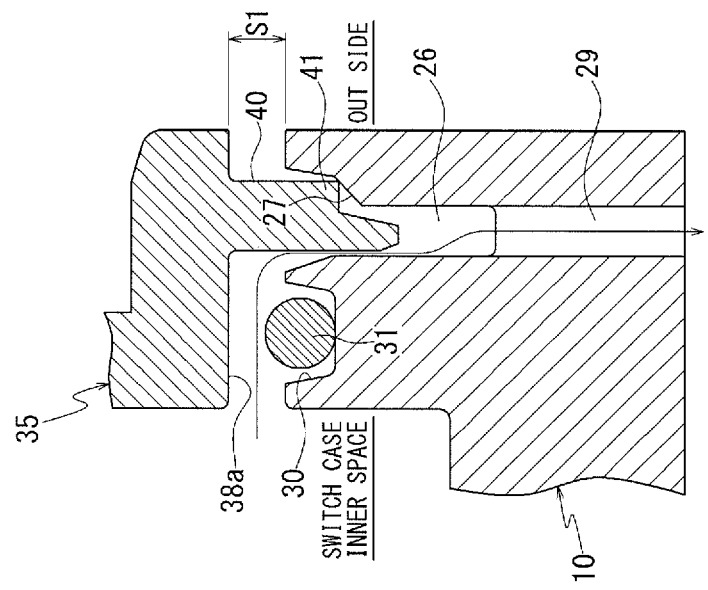
FIGS. 8A to 8D are enlarged cross sections each showing a release region in the jointing process between the substrate and the lid body according to the third embodiment.

Next, a third embodiment will be explained. In the present embodiment also, an entire basic configuration is the same as the configuration of the neutral start switch 1 shown in FIG. 1 to FIG. 3 other than the release region K. As shown in FIG. 8A, the projecting portion 40 of the lid body 35 surrounds the entire circumference, and is fitted into the concave streak portion 26 of the side wall 12, and the projecting portion 40 and the side wall 12 are jointed by high-frequency welding, thus forming the switch case 3 comprising the substrate 10 and the lid body 35 integral with each other. FIG. 7 is a perspective view showing the substrate 10 according to the present embodiment in a reverse state in the upward-downward direction.

In the substrate 10, for releasing the pressure in the switch case 3 during the jointing process between the substrate 10 and the lid body 35, a through hole 29 communicating with the concave streak portion 26 in a circumferential predetermined position of the concave streak portion 26 is provided. The through hole 29 is opened to the backside of the bottom wall 11 to form a release region K6.

FIGS. 8A to 8D are enlarged cross sections showing the jointing process between the substrate 10 and the lid body 35 in part of the release region K6. Prior to the jointing, as shown in FIG. 8A the side wall 12 of the substrate 10 surrounds the entire circumference of the bottom wall 11 for closure, and the ring groove 30 for accommodating the seal ring 31 and the concave streak portion 26 are formed along the entire circumference of the side wall 12 in that order from the inside on the top surface 25. The welding inclination surface 27 is formed in the concave streak portion 26 of the side wall 12 at the outer peripheral side in the depth portion. On the other hand, the projecting portion 40 of the lid body 35 fitted into the concave streak portion 26 of the side wall 12 also extends along the entire circumference on the flange portion 38. The through hole 29 has the same width as a width of the depth bottom of the concave streak portion 26, and for example, has a rectangular section of a width of 1.5 to 2.0 mm in the circumferential direction.

Figure 8B:
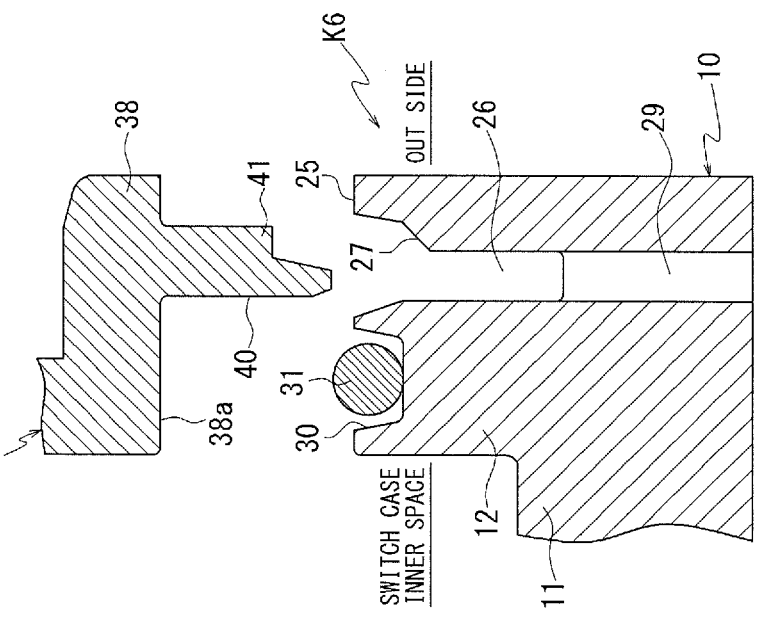

When the projecting portion 40 of the lid body 35 is inserted into the concave streak portion 26 of the substrate 10, the corner of the welding shoulder portion 41 in the projecting portion 40 first makes contact with the welding inclination surface 27 of the concave streak portion 26. In this state, a predetermined gap is formed between an inner peripheral wall surface of the concave streak portion 26 and an outer peripheral wall surface of the projecting portion 40, and this gap is formed along the entire circumference. Even if the welding shoulder portion 41 makes contact with the welding inclination surface 27, as shown in FIG. 8B the inner space in the switch case 3 formed between the lid body 35 and the substrate 10 is communicated with an outside from a space between the seal ring 31 fitted into the ring groove 30 and the lower surface 38a of the flange portion 38, via an inner peripheral gap between the concave streak portion 26 and the projecting portion 40, and through the through hole 29. Therefore, air in the inner space escapes to an outside as shown in an arrow, when the lid body 35 is pressed to the substrate 10 while welding the interference portion between the welding shoulder portion 41 and the welding inclination surface 27. Thereby, the pressure in the inner space does not increase, even if a volume of the inner space between the lid body 35 and the substrate 10 is reduced due to the progress of the melting of the interference portion by welding.

Figure 8C:
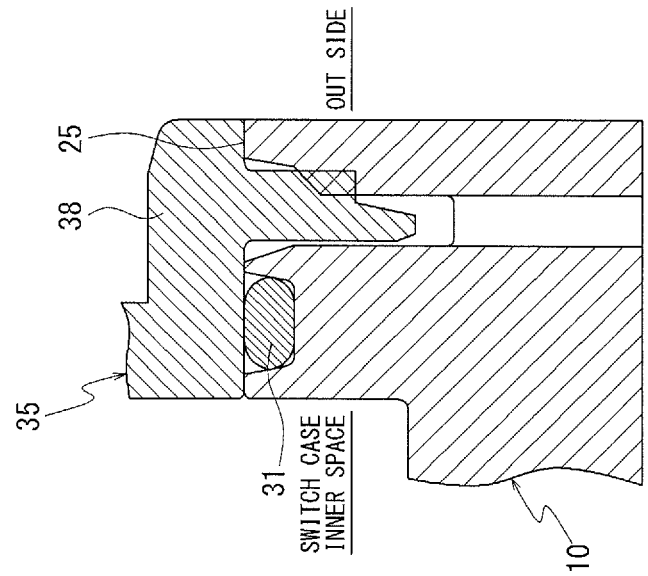
Figure 8D:
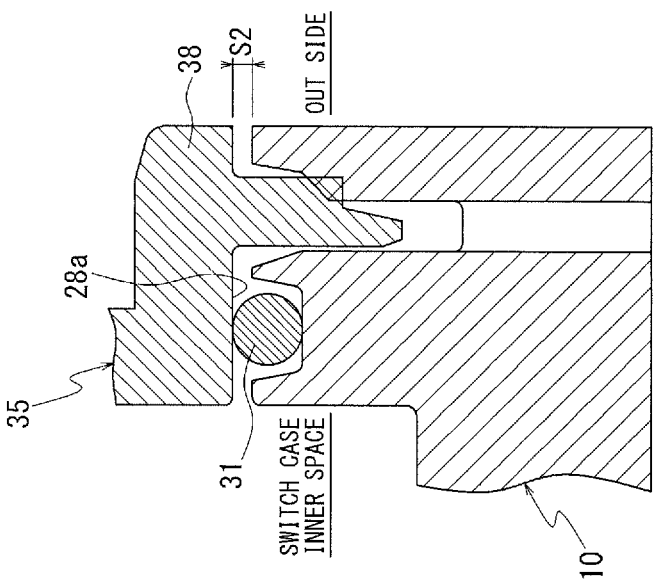

In addition, as shown in FIG. 8C, when the lower surface 38a of the flange portion 38 makes contact with the seal ring 31 in the ring groove 30, the inner space formed between the lid body 35 and the substrate 10 is eventually blocked out from the outside by the seal ring 31. After that, as the lid body 35 is further pressed to the substrate 10, as shown in FIG. 8D finally, the lower surface 38a of the flange portion 38 is seated on the top surface 25 of the side wall 12. Thereby the projecting portion 40 and the side wall 12 are welded along the entire circumference to be certainly jointed, and the seal ring 31 is interposed in a compressed state between the lid body 35 and the substrate 10. As a result, the inside of the switch case 3 is in a sealing state to an outside regardless of the release region K6 is formed.

According to the above configuration, in the release region K6, during a period from a point where the welding shoulder portion 41 and the welding inclination surface 27 makes contact with each other to a point where the interference portion of the both is welded to seal the switch case 3 (period from gap S1 to gap S2, see FIG. 8B and FIG. 8C), the communicating state of the inside of the switch case 3 with an outside is kept through the through hole 29. As a result, the pressure in the switch case 3 does not increase until the substrate 10 and the lid body 35 reach a position shown in FIG. 8D. In addition, a change in the gap between the lid body 35 and the substrate 10 from FIG. 8C to FIG. 8D is caused by deflecting the seal ring 31 projecting slightly from the ring groove 30 by the projecting amount. Therefore, the remaining pressure caused by this change is as extremely small as substantially negligible, as compared to the pressure generated in the conventional switch case 3.

It should be noted that the air escaping from the inside of the switch case 3 to an outside in the jointing process between the substrate 10 and the lid body 35 is required to pass a narrow gap between the projecting portion 40 and the inner peripheral wall surface of the concave streak portion 26 across a relatively long distance in the height direction of the projecting portion 40. Therefore the number of the release region K6 is preferably plural depending on a magnitude of the passing resistance. It is preferable that a predetermined section for setting the release region K6 is separated from the mount portion 6 of the substrate 10 such that the stress concentration is not generated around the release region K6 by heat transfer from the automatic transmission.

The present embodiment is configured as described above. That is: the top surface 25 of the side wall 12 in the substrate 10 is provided with the concave streak portion 26 in which the welding inclination surface 27 is formed in the depth portion; the lower surface 38a of the flange portion 38 in the lid body 35 is provided with the projecting portion 40 which is fitted into the concave streak portion 26 and in which the welding shoulder portion 41 is formed in the intermediate position in the overlapping direction; the top surface 25 is further provided with the ring groove 30 for accommodating the seal ring 31 inside of the concave streak portion 26; the lower surface 38a of the flange portion 38 is provided as a seal surface making contact with the seal ring 31; the switch case 3 is sealed by contact between the seal ring 31 and the seal surface (the lower surface 38a of the flange portion 38), and the substrate 10 and the lid body 35 are jointed by the welding between the welding shoulder portion 41 and the welding inclination surface 27, when the substrate 10 and the lid body 35 overlap; in the substrate 10, the through hole 29 is opened to the bottom of the concave streak portion 26 positioned in a range interposed between the welding inclination surface 27 and the ring groove 30 to form the release region K6 for communicating the opposing space between the substrate 10 and the lid body 35 with the outside; and the release region K6 maintains the communicating state of the inside of the switch case 3 with the outside until the seal ring 31 makes contact with the seal surface in the jointing process between the substrate 10 and the lid body 35.

Therefore since the pressure in the switch case 3 does not increase, the movement of the grease along the connecting piece portion 21 is not caused even if the grease is applied to the fixed contact point 20. In addition, the substrate 10 and the lid body 35 are certainly jointed and the seal ring 31 is interposed in a compressed state between the lid body 35 and the substrate 10. Thereby it is possible to keep the sealed degree in the switch case 3.

In addition, the release region K6 has a simple configuration of providing the through hole 29 between the bottom of the concave streak portion 26 and the backside of the substrate 10. Therefore there are advantages that it is easy to form the substrate 10, and since the through hole 29 faces a case of the automatic transmission and is opened to a side hidden from the outside in a state where the switch 1 is mounted on the automatic transmission, it is difficult for water or mud to enter from the release region K6 into the concave streak portion 26. In addition, since the ring groove 30 for accommodating the seal ring 31 is provided on the top surface 25 of the side wall 12 in the substrate 10, there is no possibility that the seal ring 31 drops at the time of pressing the lid body 35 to the substrate 10, so that an assembling operation thereof is easy to perform.

It should be noted that the through hole 29 has the rectangular section, but may have a circular section. The top end of the through hole 29 is opened to the bottom of the concave streak portion 26, but, not limited thereto, may be opened to arbitrary position such as the inner wall surface of the projecting portion 26 in an inner peripheral side from the welding portion (welding inclination surface 27) to the projecting portion 40 or the top surface 25 as long as the top end is in a region outside of the contact position between the seal ring 31 and the seal surface in the opposing section between the substrate 10 and the lid body 35.

In each of the aforementioned embodiments and the modifications, the top surface 25 of the side wall 12 in the substrate 10 corresponds to an end surface of the side wall and an opposing surface of a substrate in the present invention. In addition, the lower surface 38a of the flange portion 38 in the lid body 35 corresponds to an opposing surface of a lid body. Further, the welding inclination surface 27 corresponds to a first welding interference portion, and the welding shoulder portion 41 corresponds to a second welding interference portion.

It should be noted that in each of the aforementioned embodiments and modifications, the lower surface 38a, an opposing surface facing on the top surface 25 of the side wall 12, of the flange portion 38 is used as seal surface to contact with the seal ring 30 and is used as the arrangement section of the projecting portion 40. However, in a case where the lid body has no side wall and is formed in a planar shape, a peripheral edge portion of the lower surface may be provided as the opposing surface.

In the above embodiment and the modifications, the welding inclination surface 27 is formed in the concave streak portion 26 and the welding shoulder portion 41 is formed in the projecting portion 40. This invention is not limited to this configuration, and other configurations may be adoptable as long as they can interfere with each other when assembling the switch case 3 and the welding of the interference portion between them is enabled. For example, the welding shoulder portion may be formed in the concave streak portion and the welding inclination surface may be formed in the projecting portion. Further, the substrate may be provided with the projecting portion, and the lid body may be provided with the concave portion.

In the above embodiment and the modifications, additionally, the ring groove 30 for accommodating the seal ring 31 is provided on the top surface 25 of the side wall 12 in the substrate 10. But as needed, the ring groove may be formed on the opposing surface of the lid body 35. In this case, the top surface 25 of the substrate 10 is used as the seal surface. Further, as needed, any combination between each embodiment and each modification may be adopted.

Further, the present invention is high in convenience and effective in a case of being applied to a neutral start switch for a vehicular automatic transmission.

While only the selected embodiments have been chosen to illustrate the present invention, it will be apparent to those skilled in the art from this disclosure that various changes and modifications can be made therein without departing from the scope of the invention as defined in the appended claims. Furthermore, the foregoing description of the embodiments according to the present invention is provided for illustration only, and not for the purpose of limiting the invention as defined by the appended claims and their equivalents.

What is claimed is:

1. A switch comprising:
a substrate;
a lid body provided to overlap the substrate to form a switch case;
a movable board rotatably arranged in the switch case;
a plurality of fixed contact points provided on the substrate;
movable contact points provided on the movable board, at least one of the fixed contact points and at least one of the movable contact points being connected/disconnected with rotation of the movable board; and
a connecting piece portion extending inside the substrate to be connected to at least one of the fixed contact points, and being exposed as a terminal outside of the switch case, wherein
the substrate and the lid body respectively include opposing surfaces opposing with each other in a peripheral edge of the switch case,
a concave streak portion is provided in one of the opposing surface of the substrate and the opposing surface of the lid body, the concave streak portion being provided with a first welding interference portion formed in a depth portion,
a projecting portion is provided in the other of the opposing surface of the substrate and the opposing surface of the lid body, the projecting portion being fitted in the concave streak portion and being provided with a second welding interference portion formed in a predetermined section in an overlapping direction,
a ring groove for accommodating a seal ring is formed in the one of the opposing surface provided with the concave streak portion and the opposing surface provided with projecting portion, and the other is formed as a seal surface making contact with the seal ring,
when the substrate and the lid body overlap, the switch case is sealed by contact between the seal ring and the seal surface and the substrate and the lid body are jointed by the welding between the first welding interference portion and the second welding interference portion, and
a release region for keeping a communicating state of an inside of the switch case with an outside until the seal ring makes contact with the seal surface in the jointing process between the substrate and the lid body is provided in any of the substrate and the lid body in a circumferential predetermined section.

2. A switch according to claim 1, wherein
the substrate includes a side wall surrounding a peripheral edge thereof and is provided with the concave streak portion on an end surface of the side wall as the opposing surface, and
the lid body is provided with the projecting portion on the opposing surface thereof.

3. A switch according to claim 1, wherein
the release region is formed by notching the projecting portion from a root thereof.

4. A switch according to claim 1, wherein
the release region is formed by cutting off at least the second welding interference portion of the projecting portion.

5. A switch according to claim 1, wherein
the release region is formed by providing a through hole at the root of the projecting portion to penetrate outwards in parallel to the opposing surface provided with the projecting portion.

6. A switch according to claim 1, wherein
the concave streak portion is provided outside of a contact position between the seal ring and the seal surface, and
the release region is opened closer to the projecting portion than the contact position between the seal ring and the seal surface and is provided with a through hole to penetrate outwards inside the opposing surface provided with the projecting portion.

7. A switch according to claim 1, wherein
the concave streak portion is provided outside of a contact position between the seal ring and the seal surface, and
the release region is opened closer to the projecting portion than the contact position between the seal ring and the seal surface and is provided with a through hole to come across the opposing surface provided with the projecting portion for penetrating outwards.

8. A switch according to claim 1, wherein
the concave streak portion is provided outside of a contact position between the seal ring and the seal surface, and
the release region is opened in a range interposed between the contact position and the first welding interference portion in one of the substrate and the lid body, which is provided with the concave streak portion, thus communicating an opposing space to the other of the substrate and the lid body with an outside.

9. A switch according to claim 8, wherein
the release region is provided with a through hole,
the one end at the opposing space side of the through hole is opened to a bottom of the concave streak portion, and the other end of the through hole is opened to the backside of the one of the substrate and the lid body.

10. A switch according to claim 1, wherein
the ring groove is formed on the opposing surface of the substrate.

11. A switch according to claim 2, wherein
the ring groove is formed on the opposing surface of the substrate.

12. A switch according to claim 3, wherein
the ring groove is formed on the opposing surface of the substrate.

13. A switch according to claim 4, wherein
the ring groove is formed on the opposing surface of the substrate.

14. A switch according to claim 5, wherein
the ring groove is formed on the opposing surface of the substrate.

15. A switch according to claim 6, wherein
the ring groove is formed on the opposing surface of the substrate.

16. A switch according to claim 7, wherein
the ring groove is formed on the opposing surface of the substrate.

17. A switch according to claim 8, wherein
the ring groove is formed on the opposing surface of the substrate.

18. A switch according to claim 9, wherein
the ring groove is formed on the opposing surface of the substrate.

* * * * *